March 7, 1933.　　　C. B. THORESEN ET AL　　　1,900,777
AUTOMATIC HOOD LOCK FOR VEHICLES
Filed May 14, 1932　　2 Sheets-Sheet 1
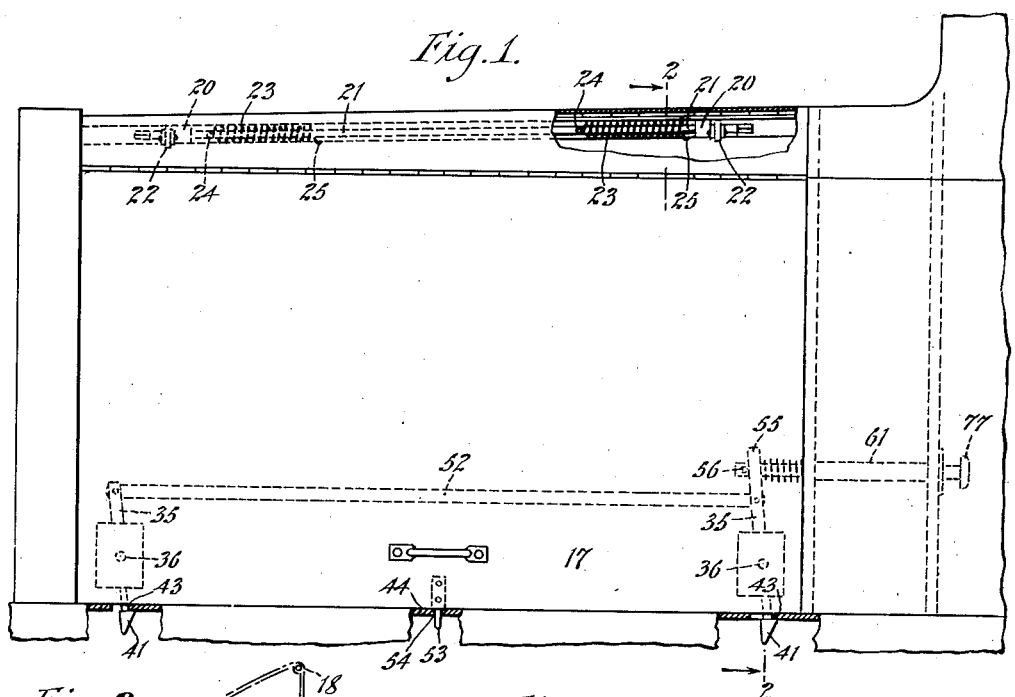
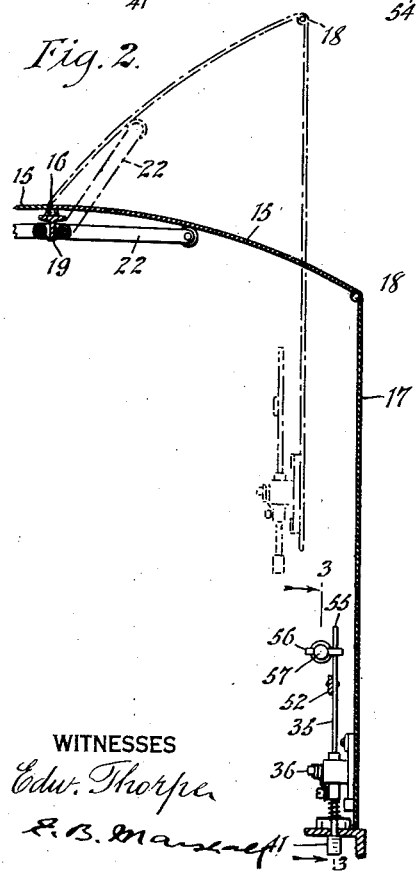
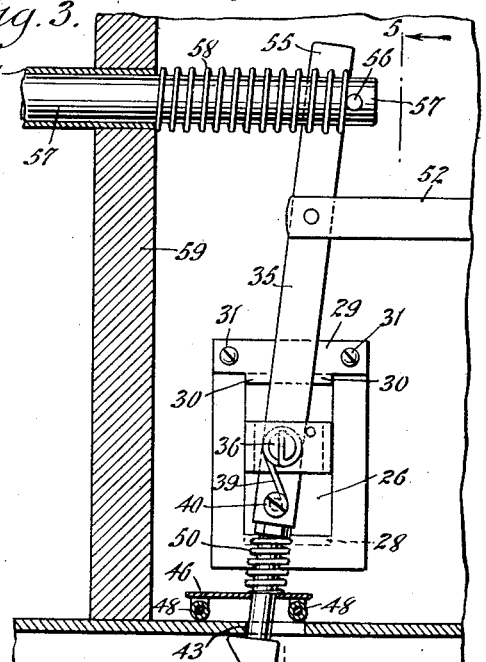
WITNESSES
Edw. Thorpe
E. B. Marseneff
INVENTORS
Carl B. Thoresen
Fred B. Eliassen
BY Munn & Co.
ATTORNEYS March 7, 1933.  C. B. THORESEN ET AL  1,900,777
AUTOMATIC HOOD LOCK FOR VEHICLES
Filed May 14, 1932  2 Sheets-Sheet 2
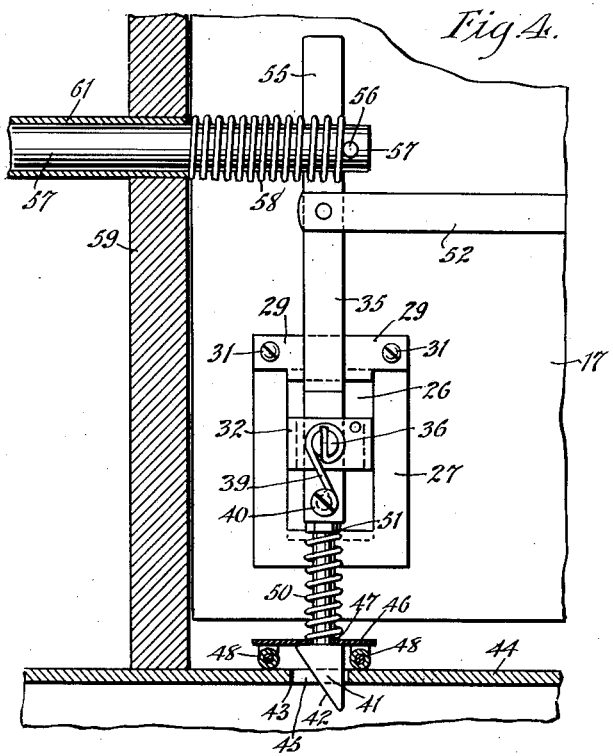
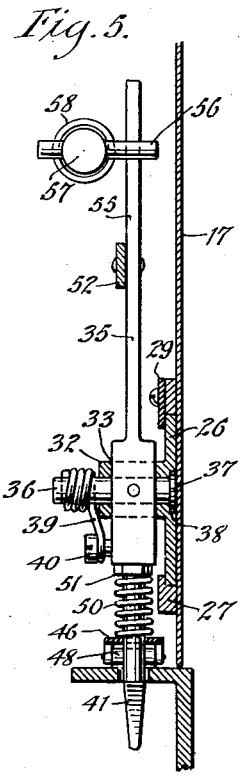
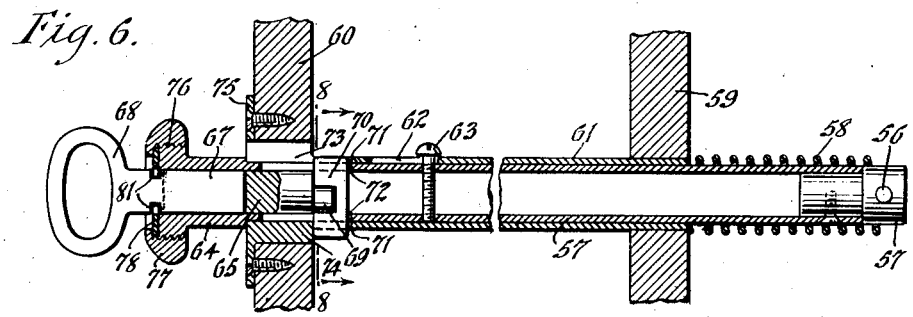
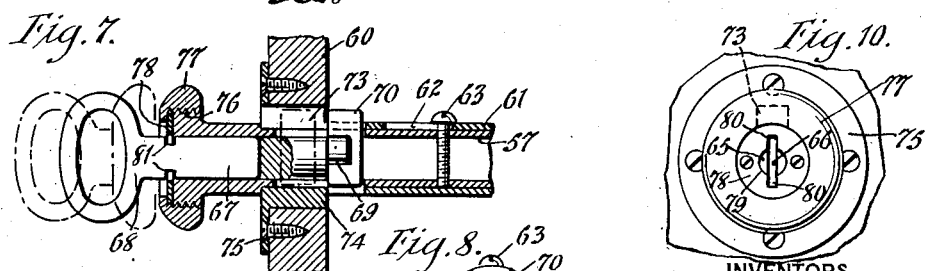
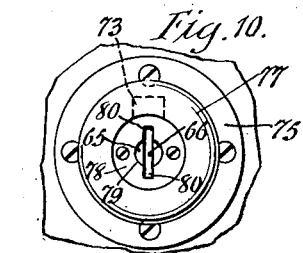
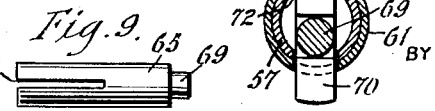
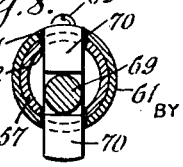
WITNESSES
INVENTORS
Carl B. Thoresen
Fred B. Eliassen
BY
ATTORNEY Patented Mar. 7, 1933

1,900,777

UNITED STATES PATENT OFFICE

CARL BERNHARD THORESEN, OF RICHMOND HILL, AND FRED B. ELIASSEN, OF BROOKLYN, NEW YORK

AUTOMATIC HOOD LOCK FOR VEHICLES

Application filed May 14, 1932. Serial No. 611,410.

An object of the invention is to provide an automatic hood lock with convenient means for unlocking the hood operable by a handle, the construction permitting of the locking of the hood independently of the handle when the hood is closed.

Another object of the invention is to provide an arm pivoted to the hood and provided with a locking head for engaging a frame member, together with resilient means for holding the arm yieldingly with its locking head in engagement with the frame member and with means for rotating the arm to move the locking head out of engagement with the frame member.

Still another object of the invention is to provide the lock with two pivoted arms connected by a link, each of the arms being provided with a locking head for engaging a frame member on the frame, one of the arms being positioned for engagement by an operating rod to move the two arms yieldingly away from the frame member against the action of resilient means which serves to hold the locking heads yieldingly in engagement with the said frame member.

A further object of the invention is to provide a carriage or carriages on the arm or arms with rollers engaging the frame member, there being resilient means engaging the carriages for holding the arms yieldingly away from the frame member.

The invention also comprehends a hood with a pin which is disposed in an aperture in the frame when the head is closed and which prevents lateral movement of the hood relatively to the frame when the locking heads engage the frame.

The invention further comprehends a locking means for the operating rod.

Additional objects of the invention will appear in the following specification in which the preferred form of the invention is described.

In the drawings similar reference characters refer to similar parts in all the views, of which Figure 1 is a side elevation of a hood provided with the lock which is the subject matter of this application, parts being broken away to illustrate the construction, Figure 2 is an enlarged fragmentary sectional view on the line 2—2 of Figure 1, Figure 3 is an enlarged fragmentary view on the line 3—3 of Figure 2, Figure 4 is a fragmentary sectional view similar to the view illustrated in Figure 3, but showing the pivoted arms in another position, Figure 5 is a sectional view on the line 5—5 of Figure 3, Figure 6 is an enlarged sectional view illustrating the operating rod and the locking means therefor, Figure 7 is a sectional fragmentary view similar to the view illustrated in Figure 6, but showing the locking means for the operating rod in open position, Figure 8 is a sectional view on the line 8—8 of Figure 6, Figure 9 is a side elevation of the member rotatably mounted at the end of the operating rod, and Figure 10 is an end view of Figure 7.

By referring to the drawings, it will be seen that each of the hoods has a member 15 pivoted at 16 and a member 17 pivoted to the member 15 at 18. A bracket 19, which supports the hood members 15 at their hinged connections 16, is provided with two sets of bearings 20, a shaft 21 being journaled in each of the said sets of bearings. There are two arms 22 secured to each of the shafts, the arms being disposed for engaging the hood members 15 for raising the latter, as illustrated by the dotted lines in Figure 2. On each of the shafts 21 there is wound a spring 23, one end 24 of each of the springs 23 being secured to a shaft 21 and the other end 25 of each of the springs 23 being secured to the bracket 19. With this construction, it will be understood that, when the hoods are free, they will be raised to the position shown in the dotted lines in Figure 2 by the said arms 22 under the influence of the springs 23.

By referring to Figures 3, 4 and 5, it will be seen that plates 26 are secured at the inner sides of the hood members 17 by disposing these plates 26 in plate holders 27, the plate holders 27 having recesses 28 for receiving the lower ends of the plates 26, the upper ends of the plates 26 being secured in position by a strip 29 which has an extension 30 which engages the sides of the tops of the plates 26. The strip 29 is secured in place by means of screws 31. With this construction, it will be understood that each of the plates 26 may be secured in position, or may be removed as may be required from the hood member 17. Preferably, there are two of these plates 26 with their plate holders 27 secured to the inner side of each of the hood members 17, as best shown by the dotted lines in Figure 1.

Each of the plates 26 has an extension 32 with an opening 33 in which a portion 34 of an arm 35 is disposed, the said portion 34 of the arm 35 being pivoted to the extension 32 and to the plate 26 by means of a pivot pin 36, which has a head 37 disposed in a recess 38 at the inner side of the plate 26. The pivot pin 36 extends beyond the extension 32 and connected with the said pivot pin 36 and with the arm 35 there is a spring 39 which serves to rotate the arm 35 on its pivot pin 36. The spring 39 is preferably secured to the arm 35 by means of a screw 40 around which the spring is turned, the screw 40 meshing in a threaded orifice in the arm 35.

Each of the arms 35 is constructed and is mounted in the manner described and each of the arms 35 has at its lower end a locking head 41, the bottoms of which are wedge-shaped, as shown at 42, so that, when the locking heads 41 are pressed downwardly against an edge 43 of a frame member 44 at an aperture 45, the locking heads 41 may pass below the said edge 43 of the frame member 44 to assume the position indicated in Figure 3 of the drawings.

Mounted on each of the pivoted arms 35 adjacent its locking head 41, there is a carriage having a body 46 with an aperture 47 through which the lower portion of a pivoted arm is disposed, the body 46 of the carriage being mounted on rollers 48 which travel on the frame member 44, so that unnecessary friction will be avoided, when the arms 35 are rotated on their pivots, the said construction also serving to move the hood members 17 upwardly when the locking heads 41 connected therewith are freed from the edges 43 of the frame member 44. This is accomplished by means of a spring 50 which is wound around the bottom of the arm 35 and which presses against the body 46 of the carriage and which at its upper end engages a shoulder 51 on the pivoted arm 35. It will, therefore, be seen that, with the freeing of the locking head 41 from the frame member 44, the locking head 41, together with its pivoted arm 35, may move upwardly, the spring 50 serving to move the said locking head with its arm 35 upwardly and from the position shown in Figure 3 to the position shown in Figure 4, carrying therewith the hood member 17.

Each of the arms 35, with its locking head 41, is mounted as has been described. The two pivoted arms 35 are connected by a link 52, so that the two pivoted arms 35 will rotate in unison on their pivots in the same direction, with the locking heads either moved to engage the frame member 44, or moved out of engagement with the said frame member.

As best shown in Figure 1, the hood member 17 has a depending pin 53 which is disposed in an aperture 54 in the frame member 44 when the hood member 17 is in closed position, as shown in Figures 1, 2 and 3 of the drawings, the said pin 53 serving to prevent any lateral movement of the hood member 17 under the influence of the pivoted arms 35, the carriages having the bodies 46 and the locking heads 41 when they are moved laterally to or from the position indicated in Figure 3.

It will be seen by referring to Figures 1, 3 and 4 of the drawings, that one of the pivoted arms 35 extends some distance above the link 52, as shown at 55. This extension 55 of one of the arms 35 is positioned for engagement by a pin 56 on an operating rod 57, so that, while the springs 39 serve to rotate the arms 35 to position the locking heads 41 as shown in Figure 3, the pin 56 on the operating rod 57 serves to rotate one of the arms 35 and the other arm 35 through the link 52 in the opposite direction to move the locking heads 41 to the positions indicated in Figure 4. A spring 58 is disposed around the operating rod 57 and engages a frame 59 at one end and the pin 56 at the other end to hold the operating rod 57 yieldingly extended and in the position indicated in Figure 3. It will be seen that, with this construction, while the pin 56 on the operating rod 57 will serve to rotate the pivoted arms 35 in one direction, the said pivoted arms may rotate in the said direction independently of the pin 56 and the operating rod 57.

The frame member 59 is connected with another frame member 60 by the sleeve 61, the operating rod, which is preferably hollow, being disposed in the sleeve 61 as illustrated in Figure 6. There is a longitudinally extending slot 62 in the sleeve 61 in which a screw or other member 63 on the operating rod 57 is disposed to prevent the rotary movement of the operating rod 57 relatively to the sleeve 61, while permitting the operating rod 57 to move longitudinally of the said sleeve. The operating rod 57 extends beyond the frame member 60, as shown at 64, and disposed in the said extension 64 there is a rotatable member 65 having a slot 66 in which a shank 67 of a key 68 may be disposed for rotating the said member 65. As indicated in Figures 6 and 7, there is an eccentric pin 69 on the rotatable member 65 and mounted on this eccentric pin 69 there is a locking member 70, the locking member 70 being disposed for moving in slots 71 in the sleeve 61 and in slots 72 in the operating rod 57. By means of the eccentric pin 69 the locking member 70 may be moved from the position shown in Figure 6 to the position shown in Figure 7. When the locking member 70 is in the position shown in Figure 6, it will abut against the frame member 60 to prevent the outward movement of the operating rod 57, but, when the locking member 70 is moved by means of the eccentric pin 69 to the position shown in Figure 7, it will be disposed at a slot 73 in the member 60 to permit of the outward movement of the operating rod 57. The slot 73 may be disposed in a bushing 74, through which the operating rod 57 may move, the said bushing 74 having an outer plate 75 by which it may be secured to the frame member 60.

The outer end of the operating rod 57 may have an outer thread 76 with which may mesh an inner thread on a hollow member 77, a plate 78 being disposed between shoulders at the outer end of the operating rod 57 and the hollow member 77, by which means the plate 78 may be held in place, this plate 78 having an opening 79 from which extend slots 80, this construction being provided for receiving the shank 67 on the key 68, the said shank 67 on the key having recesses 81 for receiving the inner edge of the plate 78 adjacent its central opening 79 when the key is turned after the key has been disposed in the said central opening 79 and in the slots 80 extending therefrom.

It will be seen from the above that the operating rod 67 may be locked by the means described and that, irrespective of the position of the operating rod 57, the pivoted arms 35 may move to permit the locking heads 41 to be disposed through the apertures 45 in the frame member 44 to position the locking heads 41 in locked position. Therefore, after the locking heads 41 have been moved to the position indicated in Figure 4 by the operating rod 57 and the means described and the hood member 17 has been opened, the hood member 17 may be again closed and locked by the locking heads 41 irrespective of the position of the operating rod 57 and whether or not the operating rod 57 is in locked or open position.

What is claimed is:

1. In combination with a frame having a movable hood, an arm pivoted to the hood on a transverse axis and provided with a locking head at one end, a frame member for engagement by the locking head, resilient means for rotating the arm in one direction to move the locking head into engagement with the frame member, and means movable longitudinally of the frame and disposed for engaging the other end of the arm to move the latter in the opposite direction, the said means being free from the arm to permit the movement of the arm relatively to the said means.

2. In combination with a frame having a movable hood, an arm pivoted to the hood and provided with a locking head, a frame member for engagement by the locking head, resilient means for rotating the arm in one direction to move the locking head into engagement with the frame member, means to move the arm in the opposite direction, a member movably mounted on the arm for movement on the frame member, and resilient means connecting the second mentioned member with the arm for moving the arm yieldingly away from the frame member.

3. In combination with a frame having a movable hood, an arm pivoted to the hood and provided with a locking head with its bottom wedge-shaped, a frame member for engagment by the locking head, resilient means for rotating the arm in one direction to move the locking head into engagement with the frame member, means to move the arm in the opposite direction, a carriage mounted on the arm and provided with rollers disposed on the frame member, and resilient means engaging the carriage and the arm for moving the arm yieldingly away from the frame member.

4. In combination with a frame having a hood, an arm pivoted to the hood and provided with a depending locking head disposed below the pivot and with its bottom wedge-shaped, a frame member for engagement by the locking head, resilient means for rotating the arm in one direction to hold the locking head in engagement with the frame member, an operating rod having a member for engaging the arm to rotate the arm in the opposite direction, and resilient means for holding the operating rod in inactive position.

5. In combination with a frame having a hood, an arm pivoted to the hood and provided with a depending locking head disposed below the pivot and with its bottom wedge-shaped, a frame member for engagement by the locking head, resilient means for rotating the arm in one direction to hold the locking head in engagement with the frame member, an operating rod having a member for engaging the arm to rotate the arm in the opposite direction, resilient means for holding the operating rod in inactive position, and means for locking the operating rod in inactive position.

6. In combination with a frame having a hood, an arm pivoted to the hood and provided with a depending locking head disposed below the pivot and with its bottom wedge-shaped, a frame member for engagement by the locking head, resilient means for rotating the arm in one direction to hold the locking head in engagement with the frame member, an operating rod having a member for engaging the arm to rotate the arm in the opposite direction, and means for locking the operating rod in inactive position.

7. In combination with a frame having a movable hood, two arms spaced apart and pivoted to the hood, each of the arms having on its lower end a locking head with its bottom wedge-shaped, a frame member having portions for engagement by the locking heads, means to rotate the arms to move the locking heads into engagement with the said portions of the frame member, a link connecting the arms, and an operating rod having a member disposed for moving one of the arms.

8. In combination with a frame having a movable hood, two arms spaced apart and pivoted to the hood, each of the arms having on its lower end a locking head with its bottom wedge-shaped, a frame member having portions for engagement by the locking heads, means to rotate the arms to move the locking heads into engagement with the said portions of the frame member, a link connecting the arms, an operating rod having a member disposed for moving one of the arms, members movably mounted on the arms for movement on the frame member, and resilient means connecting the said movably mounted members with the arms for moving the arms away from the frame member.

9. In combination with a frame having a movable hood, an arm pivoted to the hood and provided with a locking head, a frame member for engagement by the locking head, resilient means for rotating the arm in one direction, an operating rod having means for rotating the arm in the opposite direction, the operating rod being hollow at one end, an abutment, a rotatable member disposed in the said end of the operating rod and being provided with an eccentric pin, and a locking member mounted on the rotatable member to be moved by the rotation of the rotatable member to and from the abutment.

10. In combination with a frame having a movable hood, an arm pivoted to the hood and provided with a locking head, a frame member for engagement by the locking head, resilient means for rotating the arm in one direction, an operating rod having means for rotating the arm in the opposite direction, the operating rod being hollow at one end, an abutment, a sleeve in which the operating rod is disposed, a member rotatably disposed in the said end of the operating rod and having an eccentric pin, there being slots in the said end of the operating rod and in the sleeve adjacent the abutment, and a locking member mounted on the eccentric pin for passing through the slots for engaging the abutment.

CARL BERNHARD THORESEN.
FRED B. ELIASSEN.